(12) United States Patent
Fraze

(10) Patent No.: US 8,707,523 B2
(45) Date of Patent: Apr. 29, 2014

(54) DEVICE FOR SECURING WEBBING

(75) Inventor: Gary Fraze, Big Bear City, CA (US)

(73) Assignee: Duraflex Hong Kong Limited, Sheung Wan (HK)

( * ) Notice: Subject to any disclaimer, the term of this patent is extended or adjusted under 35 U.S.C. 154(b) by 86 days.

(21) Appl. No.: 13/343,285

(22) Filed: Jan. 4, 2012

(65) Prior Publication Data

US 2013/0167331 A1 Jul. 4, 2013

(51) Int. Cl.
*A44B 11/06* (2006.01)
*A44B 11/12* (2006.01)

(52) U.S. Cl.
USPC ............... 24/170; 24/164; 24/191; 24/197

(58) Field of Classification Search
USPC ....... 24/163 R, 198, 200, 164, 168–170, 191, 24/197, 16 R, 132 R, 481
See application file for complete search history.

(56) References Cited

U.S. PATENT DOCUMENTS

| | | | | |
|---|---|---|---|---|
| 2,081,385 A | * | 5/1937 | Shaw | ............................. 24/200 |
| 2,167,167 A | | 7/1939 | Benkert | |
| 6,108,877 A | | 8/2000 | Anscher et al. | |
| D562,728 S | | 2/2008 | Downing et al. | |
| D633,415 S | * | 3/2011 | Grimm et al. | ................ D11/218 |
| 2003/0041416 A1 | * | 3/2003 | D'Addario | ........................ 24/15 |
| 2007/0011850 A1 | * | 1/2007 | Downing et al. | ............. 24/16 R |
| 2009/0193628 A1 | * | 8/2009 | Gebrewold et al. | ............. 24/200 |
| 2010/0125980 A1 | | 5/2010 | Hede et al. | |
| 2010/0155521 A1 | * | 6/2010 | Paik | ........................... 242/405.1 |
| 2011/0138586 A1 | | 6/2011 | Gompert et al. | |

FOREIGN PATENT DOCUMENTS

GB 487110 6/1938

OTHER PUBLICATIONS

Sternum Adjuster with Bungee Keeper, 2010 National Molding Duraflex (made in USA) in Eng.pdf, p. 15.
International Search Report and Written Opinion of the International Searching Authority in PCT/US2012/066181, Feb. 5, 2013.
Backpack Catalog, vol. 02,"Quik Attach Mojove Female, Quik Attach Plastic-Metallic Snapbook,Quik Attach Tensionlock,New Quik Attach Sliplok,Open Gate Keeper," Jan. 2011, 1 page.

* cited by examiner

*Primary Examiner* — Robert J Sandy
*Assistant Examiner* — Louis Mercado
(74) *Attorney, Agent, or Firm* — Collard & Roe, P.C.

(57) ABSTRACT

A webbing securing device comprises a main body having two side arms, a first end, a second end, a cavity between the side arms and a cord securing mechanism. There is a releasable central arm connected to the main body adjacent the first end and an elastic cord connected to the second end. The elastic cord is adapted to be secured on the cord securing mechanism, and is dimensioned so that the cord must be stretched in order to be secured on the cord securing mechanism. A length of webbing is secured in the device by feeding a loop of webbing in between the side arms and over the central arm, or over the side arms and underneath the central arm, and securing the elastic cord on the cord securing mechanism, so that the webbing is secured between the side arms and the central arm.

9 Claims, 6 Drawing Sheets

DEVICE FOR SECURING WEBBING

BACKGROUND OF THE INVENTION

1. Field of the Invention

This invention relates to a device that can releasably secure a strap as well as a hydration tube.

2. The Prior Art

Devices for securing webbing can have a variety of different structures, depending on their function. One device is shown in United States Patent Application Publication No. US2010/0155521A1 to Paik. In this device, webbing is rolled around a structure having two posts connected by end pieces. A bungee cord secures the webbing and is stretched between the two end pieces. While this device is useful for taking up a loose end of webbing and keeping it from getting in the way, it would be desirable to find a webbing holder that can be more easily released and which can perform a variety of functions.

SUMMARY OF THE INVENTION

It is therefore an object of the invention to provide a device for holding webbing that is simple to operate and easy to release.

This object is accomplished by a device for securing webbing comprising a main body having two generally parallel side arms, a first end, a second end and a cavity between the side arms, and a cord securing mechanism connected to the first end of the main body. There is a releasable central arm connected to the main body at least adjacent the first end. An elastic cord is connected to the second end and is adapted to be secured on the cord securing mechanism. The elastic cord is dimensioned so that the cord must be stretched in order to be secured on the cord securing mechanism, so that the cord cannot slip or move and holds the webbing in place.

A length of webbing is secured in the device by feeding a loop of webbing in between the side arms and over the central arm, or over the side arms and underneath the central arm, and securing the elastic cord on the cord securing mechanism, so that the webbing is secured between the side arms and the central arm. With this device, other objects could also be secured by the elastic cord, in particular a hydration tube. Thus, this device could be used on backpacks, jackets and other wearable items, and provides a convenient way to releasably secure a hydration tube for easy access. Other objects could also be secured by the device, such as a whistle, writing implement, or any other device that can fit across the object.

In one embodiment, the cord securing mechanism is a hook and the elastic cord is in the form of a loop that is secured around the hook. The elastic cord could be secured to the main body by feeding it through apertures in the second end of the main body.

The central arm can be pivotally connected to the main body at the first end, and can have a free end extending toward the second end. The central arm pivots between a closed position where the central arm rests on the second end of the main body and an open position where the free end is raised up from the main body. This allows easy adjustment of the webbing by raising up the bar to loosen the webbing. This also allows the webbing to be inserted more easily, as the pivoting of the arm opens up more space for feeding the webbing. The central arm is preferably spring-loaded so that the arm can be fixed only in the fully open or fully closed position. This ensures that the arm remains in the open or closed position as the user is adjusting the webbing, and prevents unnecessary slippage of the webbing when the arm is in the closed position.

In a preferred embodiment, the central arm is in the form of a loop with two ends, each end being secured in apertures in the first end of the main body. The arm then extends all the way to the second end of the device. This configuration allows for an easy way to configure the spring loading of the arm as mentioned above. In this embodiment, the arm is preferably made of metal or plastic, but other materials could also be used. The arm can be detachable, so that different arms can be placed on a single body.

In one embodiment, there is a slot in the second end of the main body for receiving an additional length of webbing. This additional length of webbing could be used to attach the device to a backpack, jacket, tent or other item.

In another embodiment, the central arm is formed from an elastic cord as well. This cord could be a separate cord from the one that secures the hydration tube, or could be formed from the same cord. If a single elastic cord is used, the cord runs from the first end, through the apertures in the second end, forming the central bar, and then extends back to the first end, forming the holder for the hyderation tube or other object.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENTS

Figure 1:
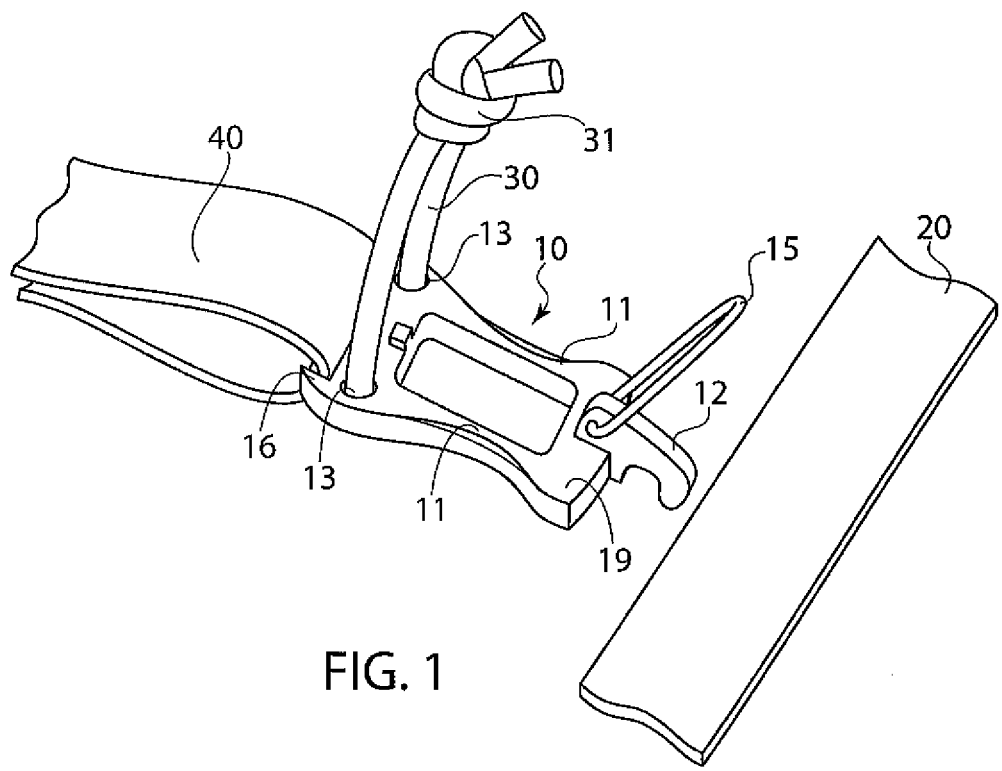
FIG. 1 shows a first embodiment of the device according to the invention prior to securing the webbing.

Referring now in detail to the drawings, FIGS. 1-5 show the device according to the invention in various stages of assembly. The device comprises a main body 10 having two generally parallel side arms 11, a first end 19, a second end 16 and a cavity between the side arms 11. There is a cord securing mechanism in the form of a hook 12 connected to the first end of the main body. There is a releasable central arm 15 connected to the main body 10 at least adjacent the first end 19. An elastic cord 30 is connected to the second end 16 and is adapted to be secured on the hook 12. The elastic cord 30 is dimensioned so that it must be stretched in order to be secured on hook 12, so that the cord 30 cannot slip or move and holds the webbing 20 in place.

Figure 2:
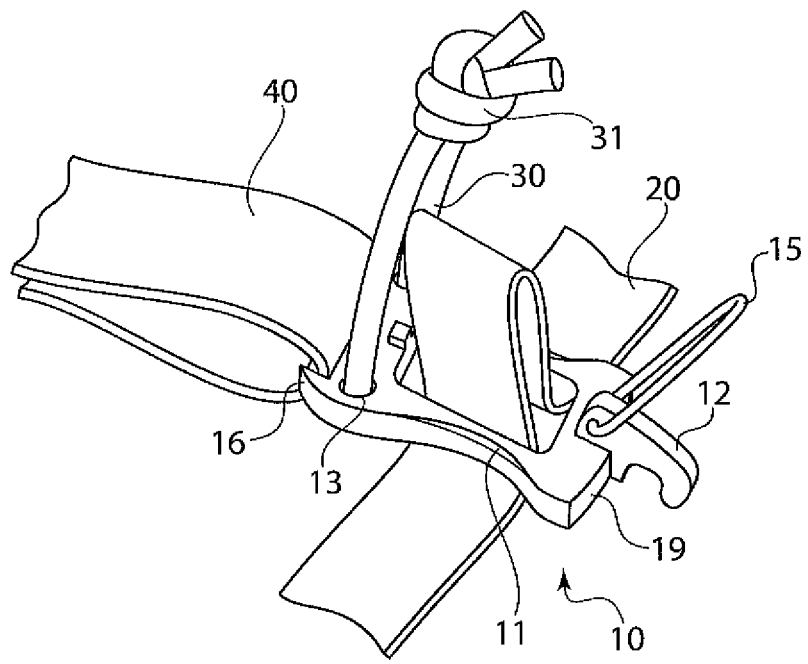
FIG. 2 shows a length of webbing threaded into the device of FIG. 1 with the central arm in a raised position.
Figure 3:
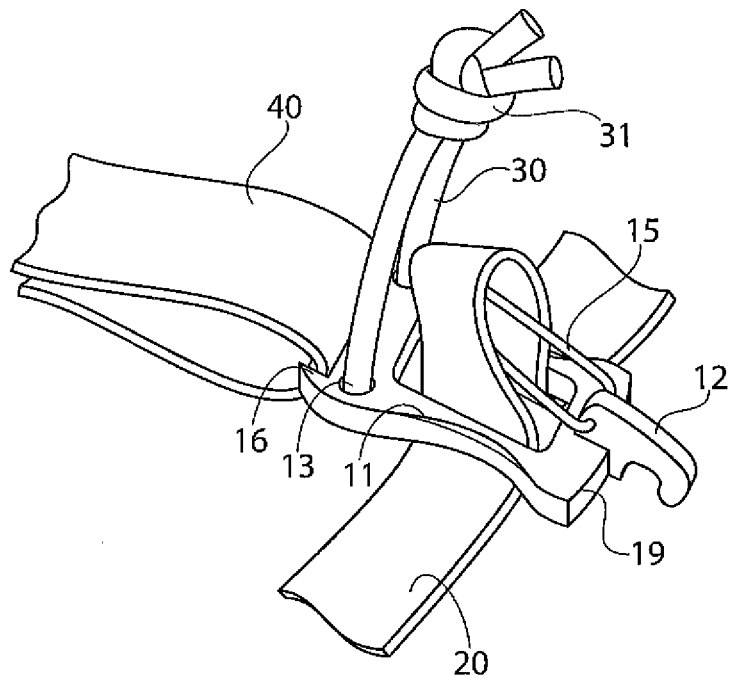
FIG. 3 shows the embodiment of FIG. 2 with the arm inserted into the loop of webbing.
Figure 4:
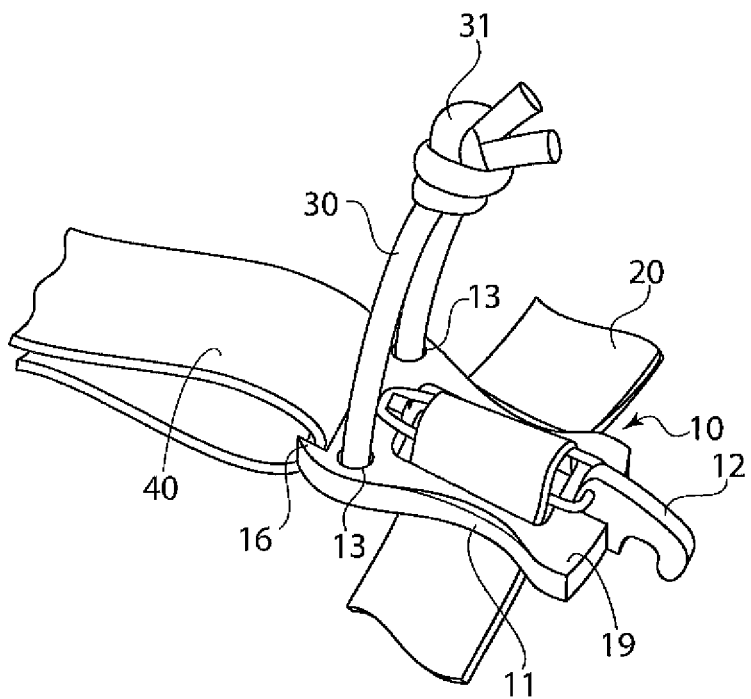
FIG. 4 shows the webbing threaded around the central arm in the closed position.
Figure 5:
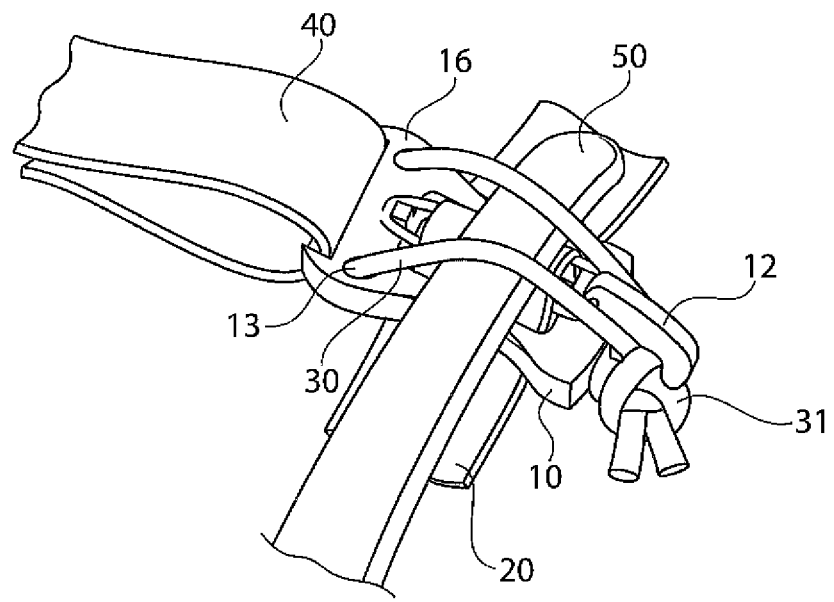
FIG. 5 shows the elastic cord secured around a hydration tube in the embodiment of FIGS. 1-4.

As shown in FIGS. 2-4, a length of webbing 20 is secured in the device by feeding a loop of webbing 20 in between the side arms 11 and over the central arm 15 (FIG. 3), or over the side arms and underneath the central arm (as shown later in FIG. 9), and securing the elastic cord 30 on hook 12 (FIG. 5), so that the webbing is secured between the side arms and the central arm. Hydration tube 50 can be inserted in between cord 30 and body 10, as shown in FIG. 5. This arrangement keeps hydration tube 50 secure and in a convenient location for the user.

Cord 30 is in the form of a loop with a knot 31 on the ends. Cord 30 is secured to the main body 10 by feeding it through apertures 13 in the second end 16 of the main body 10.

Figure 6:
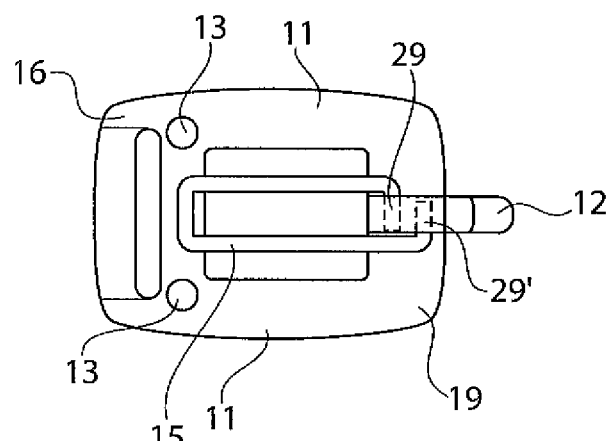
FIG. 6 shows an alternative embodiment of the invention having a plastic central arm.
Figure 8:
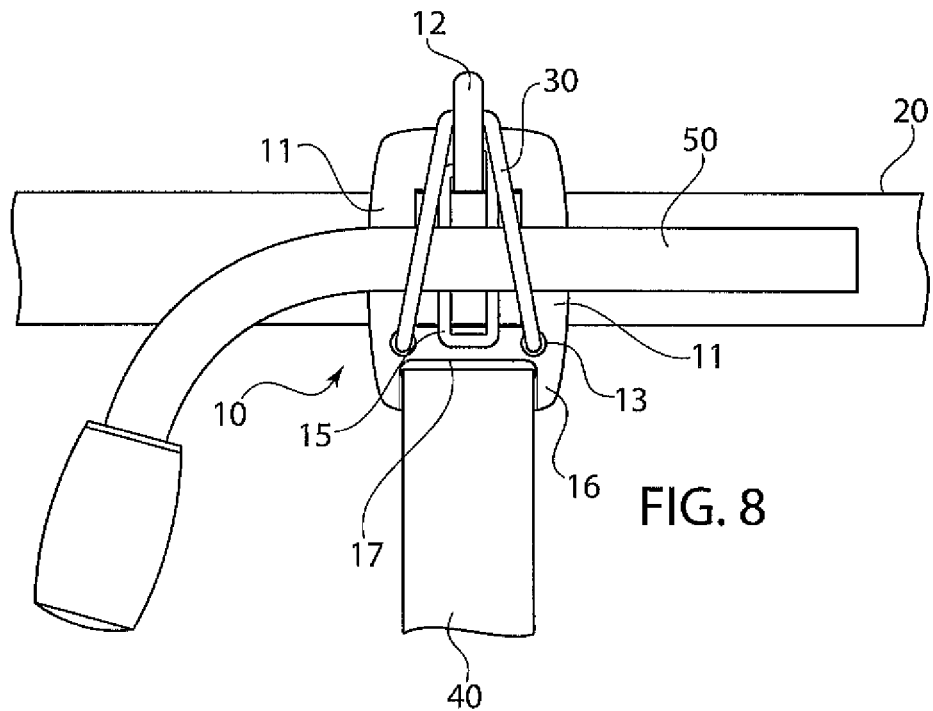
FIG. 8 shows the embodiment of FIG. 6 with webbing an a hydration tube attached.

Central arm 15 can be made of metal or of plastic, (as shown in FIG. 6). Central arm 15 can be pivotally connected to the main body 10 at the first end 19 with the free end extending toward the second end 16. The central arm 15 pivots between a closed position as shown in FIGS. 5 and 8, where the central arm 15 rests on the second end 16 of the main body 10, and an open position, as shown in FIGS. 1-3, where the free end is raised up from the main body 10. This allows easy adjustment of the webbing 20 by raising up the arm 15 to loosen the webbing 20. This also allows the webbing 20 to be inserted more easily, as the pivoting of the arm 15 opens up more space for feeding the webbing 20. Central arm 15 can be spring-loaded so that it can be fixed only in the fully open or fully closed position. This ensures that the arm 15 remains in the open or closed position as the user is adjusting the webbing, and prevents unnecessary slippage of the webbing when the arm is in the closed position.

Figure 7:
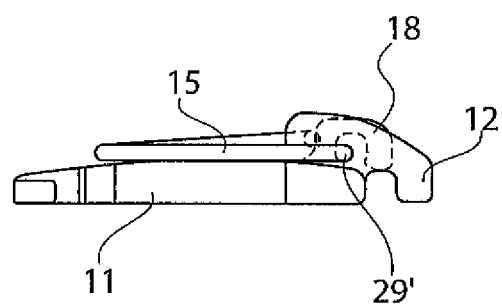
FIG. 7 shows a side view cross-sectional view of the embodiment of FIG. 6.

In the embodiment shown in FIG. 6, central arm 15 is in the form of a loop with two ends 29, 29', each end being secured in apertures in the first end 19 of the main body 10. The arm then extends all the way to the second end of the device. As shown in FIGS. 6 and 7, one end 29' of arm 15 extends through a cavity in interior hook 18 of body 10, and the other arm 29 extends through an aperture in this hook that is located closer to the second 16 of main body 10.

There is a slot 17 in the second end of the main body 10, for receiving an additional length of webbing 40. This additional length of webbing 40 could be used to attach the device to a backpack, jacket, tent or other item.

As shown in FIGS. 9-13, instead of using a metal or plastic central arm 15, the function of the central arm could be performed by elastic cord 30 as well, or by a separate cord (not shown). In this embodiment, cord 30 runs from the first end 19, by hooking it over hook 12 and under first end 19, over webbing 20, through the apertures 13 in the second end 16, thus forming a central arm, and then extending back to the first end 19 over the top of main body 10 for placement under hook 12 (FIG. 10), thus, forming a holder for hydration tube 50.

Figure 9:
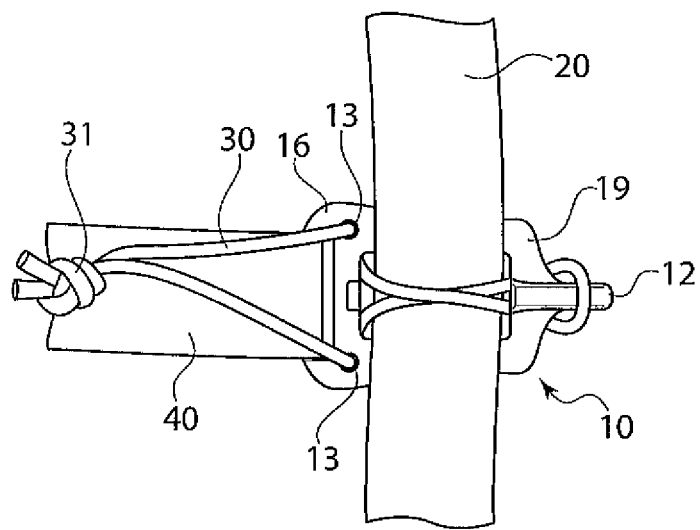
FIG. 9 shows an alternative embodiment of the invention, with a length of the elastic cord functioning as the central arm.
Figure 10:
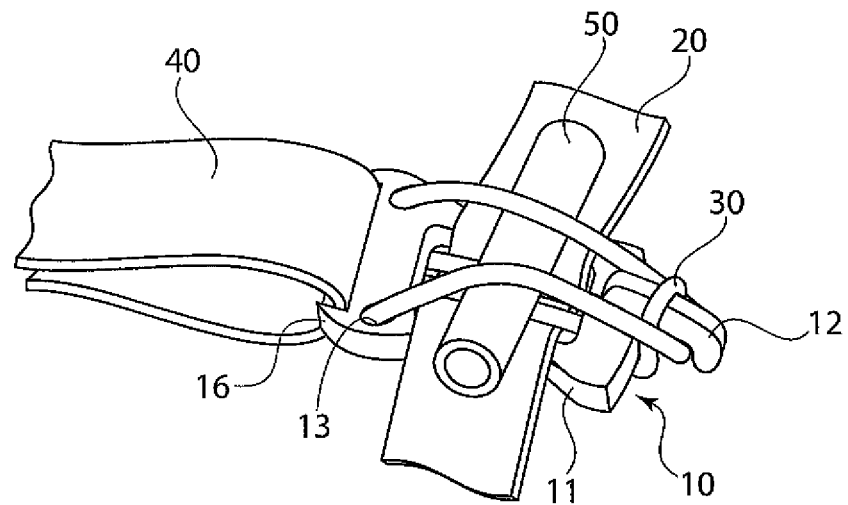
FIG. 10 shows the embodiment of FIG. 9 with a hydration tube attached.
Figure 11:
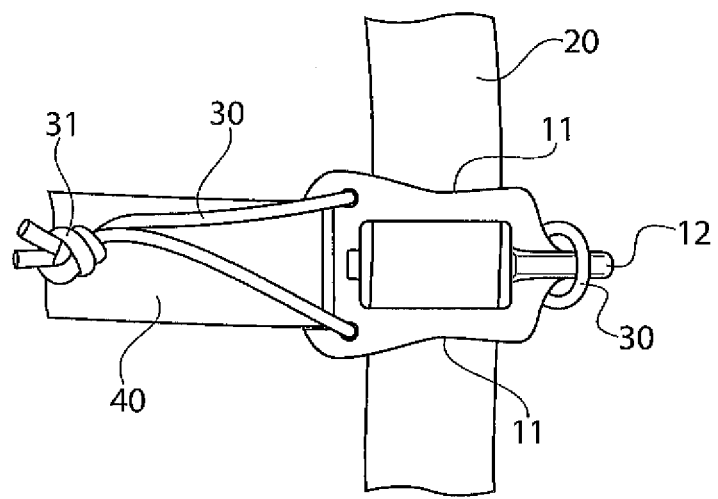
FIG. 11 shows an alternative webbing arrangement of the embodiment of FIG. 9.
Figure 12:
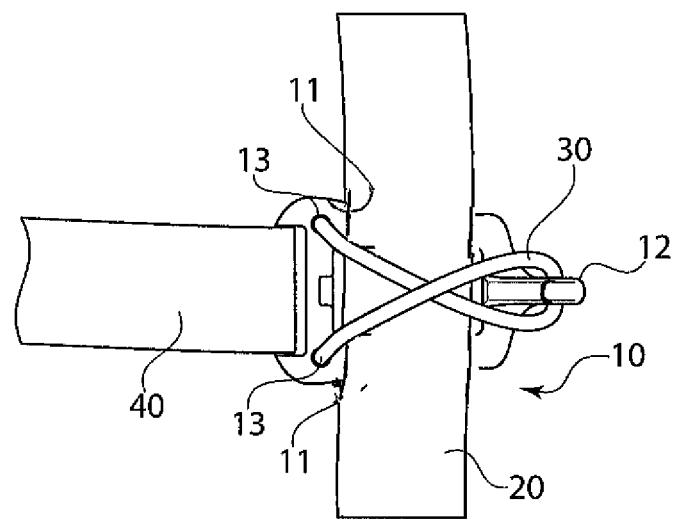
FIG. 12 shows the embodiment of FIG. 11 in a second view.
Figure 13:
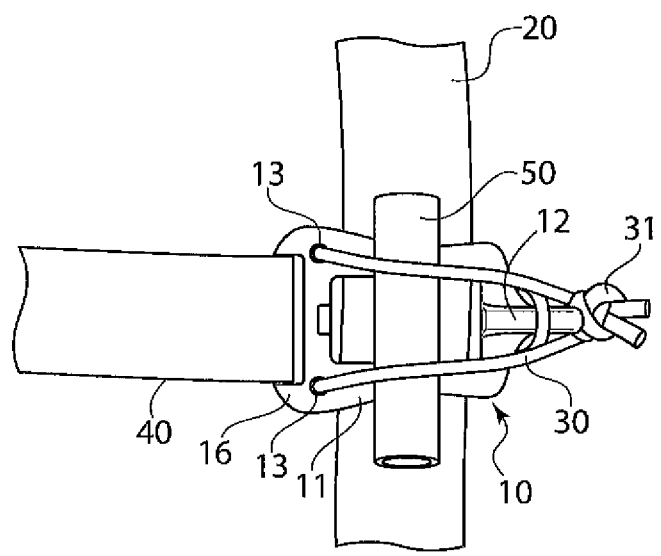
FIG. 13 shows the embodiment of FIG. 11 with a hydration tube attached.

An alternative arrangement of cord 30 is shown in FIGS. 11-13. Here, cord 30 is hooked over hook 12, underneath main body 10 and webbing 20 (see top view in FIG. 11 and underside view in FIG. 12), up through holes 13 in main body 10 and over the top of webbing 20 and main body 10, to be hooked underneath hook 12, as shown in FIG. 13. Crossing cord 30 as it extends across main body 10, either on top of webbing 20 as shown in FIG. 9, or underneath it as shown in FIG. 12, provides a more secure arrangement of cord 30 and prevents excess slippage of cord 30 or webbing 20.

Accordingly, while only a few embodiments of the present invention have been shown and described, it is obvious that many changes and modifications may be made thereunto without departing from the spirit and scope of the invention.

What is claimed is:

1. A device for securing webbing, comprising:
a main body having two generally parallel side arms, a first end, a second end and a cavity between the side arms;
a cord securing mechanism connected to the first end of the main body;
a releasable central arm connected to the main body at least adjacent the first end;
an elastic cord connected to the second end and being adapted to be secured on the cord securing mechanism, the elastic cord being dimensioned so that the cord must be stretched in order to be secured on the cord securing mechanism;
wherein a length of webbing is secured in the device by feeding a loop of webbing in between the side arms and over the central arm, or over the side arms and underneath the central arm, and securing the elastic cord on the cord securing mechanism, so that the webbing is secured between the side arms and the central arm; and
wherein the cord securing mechanism is a hook and wherein the elastic cord is in the form of a loop.

2. The device according to claim 1, wherein the central arm is pivotally connected to the main body at the first end and has a free end extending toward the second end, said central arm pivoting between a closed position where the central arm rests on the second end of the main body and an open position where the free end is raised up from the main body.

3. The device according to claim 2, wherein the central arm is spring loaded so that the central arm can be fixed only in a fully open or fully closed position.

4. The device according to claim 1, further comprising a slot in the second end of the main body, said slot being adapted to receive an additional length of webbing.

5. The device according to claim 1, wherein the second end has two apertures therethrough and wherein the elastic cord extends through both apertures.

6. A device for securing webbing, comprising:
a main body having two generally parallel side arms, a first end, a second end and a cavity between the side arms;
a cord securing mechanism connected to the first end of the main body;
a releasable central arm connected to the main body at least adjacent the first end;
an elastic cord connected to the second end and being adapted to be secured on the cord securing mechanism, the elastic cord being dimensioned so that the cord must be stretched in order to be secured on the cord securing mechanism;
wherein a length of webbing is secured in the device by feeding a loop of webbing in between the side arms and over the central arm, or over the side arms and underneath the central arm, and securing the elastic cord on the cord securing mechanism, so that the webbing is secured between the side arms and the central arm;
wherein the central arm is pivotally connected to the main body at the first end and has a free end extending toward the second end, said central arm pivoting between a closed position where the central arm rests on the second end of the main body and an open position where the free end is raised up from the main body; and wherein the central arm is in a form of a loop with two ends, each end being secured in apertures in the first end of the main body.

7. The device according to claim 6, wherein the central arm is made of metal or plastic.

8. A device for securing webbing, comprising:

a main body having two generally parallel side arms, a first end, a second end and a cavity between the side arms;

a cord securing mechanism connected to the first end of the main body;

a releasable central arm connected to the main body at least adjacent the first end;

an elastic cord connected to the second end and being adapted to be secured on the cord securing mechanism, the elastic cord being dimensioned so that the cord must be stretched in order to be secured on the cord securing mechanism;

wherein a length of webbing is secured in the device by feeding a loop of webbing in between the side arms and over the central arm, or over the side arms and underneath the central arm, and securing the elastic cord on the cord securing mechanism, so that the webbing is secured between the side arms and the central arm; and wherein the central arm is formed from an elastic cord.

9. A device for securing webbing, comprising:

a main body having two generally parallel side arms, a first end, a second end and a cavity between the side arms;

a cord securing mechanism connected to the first end of the main body;

a releasable central arm connected to the main body at least adjacent the first end;

an elastic cord connected to the second end and being adapted to be secured on the cord securing mechanism, the elastic cord being dimensioned so that the cord must be stretched in order to be secured on the cord securing mechanism;

wherein a length of webbing is secured in the device by feeding a loop of webbing in between the side arms and over the central arm, or over the sidearms and underneath the central arm, and securing the elastic cord on the cord securing mechanism, so that the webbing is secured between the side arms and the central arm; and wherein the elastic cord that is connected to the second end also forms the central arm, such that the elastic cord runs from the first end to the second end forming the central arm, extends through apertures in the second end, and is adapted to be secured on the cord securing mechanism.

* * * * *